(12) United States Patent
Colorado

(10) Patent No.: US 10,265,554 B2
(45) Date of Patent: Apr. 23, 2019

(54) RAPID ESCAPE ANCHOR

(71) Applicant: FIRE INNOVATIONS LLC, Petaluma, CA (US)

(72) Inventor: Juancarlos Colorado, Petaluma, CA (US)

(73) Assignee: FIRE INNOVATIONS LLC, Petaluma, CA (US)

( * ) Notice: Subject to any disclaimer, the term of this patent is extended or adjusted under 35 U.S.C. 154(b) by 0 days.

(21) Appl. No.: 15/928,009

(22) Filed: Mar. 21, 2018

(65) Prior Publication Data

US 2018/0272163 A1  Sep. 27, 2018

Related U.S. Application Data

(60) Provisional application No. 62/474,305, filed on Mar. 21, 2017.

(51) Int. Cl.
| | |
|---|---|
| *A62B 35/00* | (2006.01) |
| *A62B 3/00* | (2006.01) |
| *A62B 5/00* | (2006.01) |
| *F16B 45/00* | (2006.01) |

(52) U.S. Cl.
CPC .......... *A62B 35/0068* (2013.01); *A62B 35/00* (2013.01); *A62B 35/0037* (2013.01); *A62B 35/0043* (2013.01); *A62B 3/00* (2013.01); *A62B 5/00* (2013.01); *F16B 45/00* (2013.01)

(58) Field of Classification Search
CPC . A62B 35/00; A62B 35/0043; A62B 35/0037; A62B 35/0068; A62B 35/0075; A62B 35/0093; A62B 35/0006; A62B 5/00; A62B 3/00; A62B 1/16; A45C 2013/1015; Y10T 24/4512; Y10T 24/45435; Y10T 24/4755; A47G 1/20; A47G 1/22; F16B 45/00; F16M 13/02; E06C 7/14; E06C 7/143; E06C 7/146
USPC ... 248/217.3, 216.1, 217.1, 218.3, 305, 306; 14/298, 309, 294
See application file for complete search history.

(56) References Cited

U.S. PATENT DOCUMENTS

| | | | | |
|---|---|---|---|---|
| 195,161 | A * | 9/1877 | Philbrook | A62B 1/20 182/190 |
| 216,008 | A * | 5/1879 | Wilson | F16L 3/04 248/71 |
| 842,220 | A * | 1/1907 | Martin | B66C 1/34 24/698.1 |
| 951,463 | A * | 3/1910 | Spears | B66C 1/34 294/82.1 |
| 1,050,479 | A * | 1/1913 | Long | B66C 1/34 294/82.1 |

(Continued)

*Primary Examiner* — Nkeisha Smith
(74) *Attorney, Agent, or Firm* — Craig M. Stainbrook; Stainbrook & Stainbrook, LLP

(57) ABSTRACT

A self-righting rapid escape anchor including a shank and an integral hook, together forming front and rear sides, right and left sides, a lower end having a rope hole for passing a safety rope, a body slot in the shank, a saddle slot in the hook, and a tip holder at the terminal end of the hook for removably attaching a hardened steel piercing tip. The weight distribution of the tip in relation to the shank and hook induces rotation about the longitudinal axis of the anchor to place the anchor in a point down orientation when it is pulled longitudinally by a rope attached to the rope hole.

19 Claims, 5 Drawing Sheets

(56) References Cited

U.S. PATENT DOCUMENTS

| | | | | |
|---|---|---|---|---|
| 1,160,016 | A * | 11/1915 | Utsman | B66C 1/34 294/82.1 |
| 1,422,228 | A * | 7/1922 | Shaffer | B66C 1/585 24/698.1 |
| 2,232,094 | A * | 2/1941 | Canfield | B60R 7/10 224/482 |
| 2,398,464 | A * | 4/1946 | Salisbury | B66C 1/585 294/82.1 |
| 4,167,108 | A * | 9/1979 | Jarman | B21D 1/12 24/369 |
| 4,748,965 | A * | 6/1988 | Ament | F41B 5/1426 124/89 |
| 4,785,509 | A * | 11/1988 | Fisher | B63B 21/54 114/230.3 |
| 5,564,766 | A * | 10/1996 | Lowery | B60D 1/00 280/480 |
| 5,997,063 | A * | 12/1999 | McCraw | B60D 1/00 294/82.1 |
| 7,726,713 | B2 * | 6/2010 | Oleksia | A62B 3/005 254/131 |
| 9,409,055 | B1 * | 8/2016 | Niemela | A63B 27/00 |
| 9,494,183 | B2 | 11/2016 | Botti | |
| 9,821,175 | B2 * | 11/2017 | Dapkins, Jr. | A62B 3/005 |
| 2009/0094843 | A1 * | 4/2009 | Brannam | A62B 3/005 30/366 |
| 2009/0100738 | A1 * | 4/2009 | Sullivan | A01K 81/04 43/6 |
| 2009/0265901 | A1 * | 10/2009 | Berney | F16B 45/00 24/591.1 |
| 2009/0307847 | A1 * | 12/2009 | Liou | B25F 1/00 7/166 |
| 2010/0193288 | A1 * | 8/2010 | Colorado | A62B 1/16 182/3 |
| 2010/0207410 | A1 * | 8/2010 | Leon | A62B 1/04 294/82.1 |
| 2012/0240417 | A1 * | 9/2012 | Lee | A62B 3/00 30/366 |
| 2014/0116803 | A1 * | 5/2014 | Overbaugh | E06C 1/56 182/8 |
| 2016/0317849 | A1 * | 11/2016 | Cowell | A62B 35/0068 |
| 2017/0146044 | A1 * | 5/2017 | Call | F16B 25/0021 |
| 2017/0266471 | A1 | 9/2017 | Colorado | |
| 2018/0142724 | A1 * | 5/2018 | Choate | F16B 45/00 |
| 2018/0167021 | A1 * | 6/2018 | O'Rourke | H02S 20/23 |

* cited by examiner

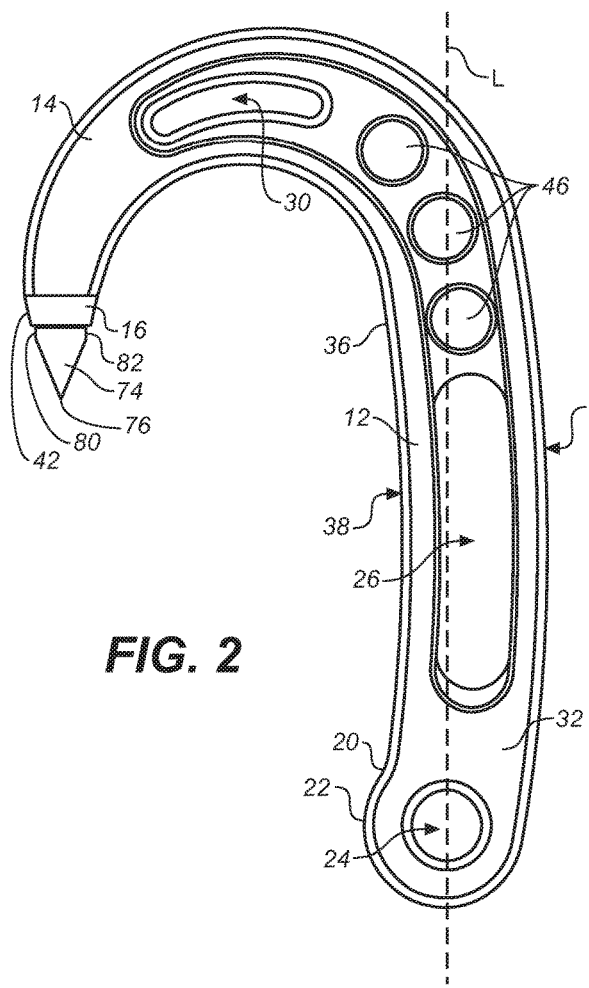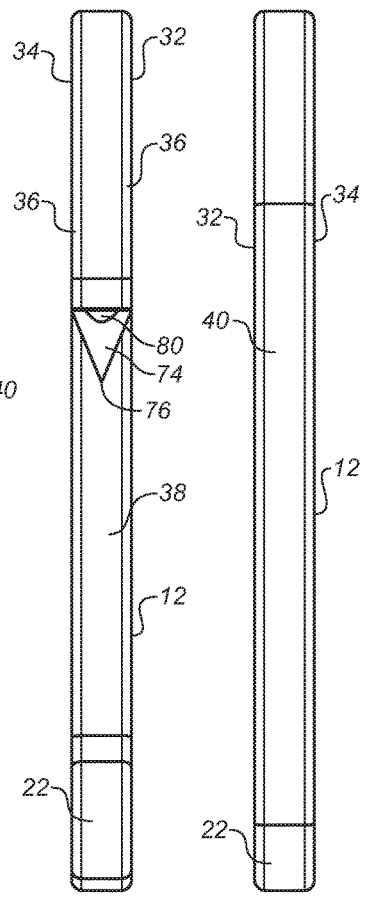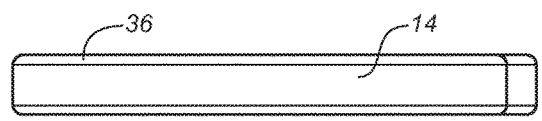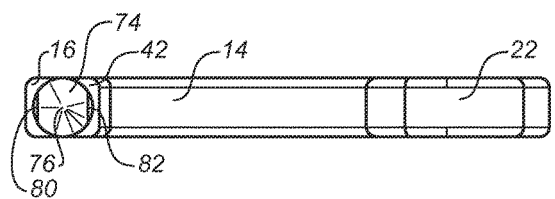
FIG. 2
FIG. 3  FIG. 4
FIG. 5
FIG. 6

RAPID ESCAPE ANCHOR

CROSS REFERENCES TO RELATED APPLICATIONS

The present application claims the benefit of U.S. Provisional Patent Application Ser. No. 62/474,305 filed Mar. 21, 2017 (Mar. 21, 2017).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present relates most generally to apparatus and systems for performing a controlled rope descent from a height in the kinds of emergency conditions encountered by emergency first responders, firefighters, and military or law enforcement personnel. More particularly the invention relates to an anchoring hook employed to secure the upper end of an abseiling/rappelling rope, and still more particularly to a lightweight, self-righting hook for anchoring a rope to a structural feature for performing a rapid descent.

Background Discussion

Emergency rescue personnel (principally firefighters and military and law enforcement personnel) may encounter conditions requiring a very rapid egress from a building or other structure at some height. When trapped in a structure above ground level and in urgent need of getting to ground, but when having no reasonable means to descend to ground level in a customary manner (using stairs, elevators, and the like), it is desirable to have equipment that provides for a safe descent in a non-customary manner—such as by jumping from a window. To that end, lightweight bailout systems have been developed to be carried on the person and typically attached to a utility belt (trucker's belt or climbing harness) that include a pouch for storing an easily deployed safety rope, a carabiner attached to both a ring on the belt or harness and to a lanyard that is, in turn, connected to a descender (Type I, II, or III) through which the safety rope feeds during an emergency descent, and an anchor for securing the abseil rope to a structure at some height above ground.

Anchoring devices for use in such systems have been the focus of considerable interest and inventive energy. Commendable designs include the escape hook described in U.S. Pat. No. 9,494,183, to Botti, which is a lightweight hook made from a high strength iron or titanium alloy. The hook is sized with an opening suited to fit about the radius of most radiators, which are frequently located near a window in older structures in cold climates. The hook is shaped for use as a choker, a carabiner, and for placement of a Halligan tool, or other firefighting hand tool, through the handle of the hook as a method to secure the hook to a wall. The hook includes a sharp tip for penetrating into walls, a chair, a mattress, or other penetrable object recruited for use as a support object. Botti '183 includes a thorough background discussion of other prior art devices and systems, which in the interests of brevity will not be repeated here, but which is nonetheless incorporated by reference herein. Note should be made that none of the systems considered by Botti '183, nor Botti '183 itself, describe, disclose, teach, or suggest the inventive rapid escape anchor of the present invention.

BRIEF SUMMARY OF THE INVENTION

The present invention is an advanced anchoring option for emergency escape. The anchor is a hook precision machined from 7000 series aluminum. It may provide secure remote anchoring through a hitching slot, or it can be used as a hook anchor at the window sill. The hook weighs less than 7 ounces, thereby minimizing the weight of the overall escape system. The hook is designed for use with an escape class descent control device specified by NFPA 1983-2017, such as the device disclosed in pending U.S. patent application Ser. No. 15/463,572, U.S. Pat. Publication No. 20170266471, which is incorporated in its entirety by reference herein.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 2 is a right side view in elevation thereof;

FIG. 3 is a front view in elevation;

FIG. 4 is a rear view in elevation;

FIG. 5 is a top plan view thereof;

FIG. 6 is a bottom plan view;

DETAILED DESCRIPTION OF THE INVENTION

Figures 1A, 1B:
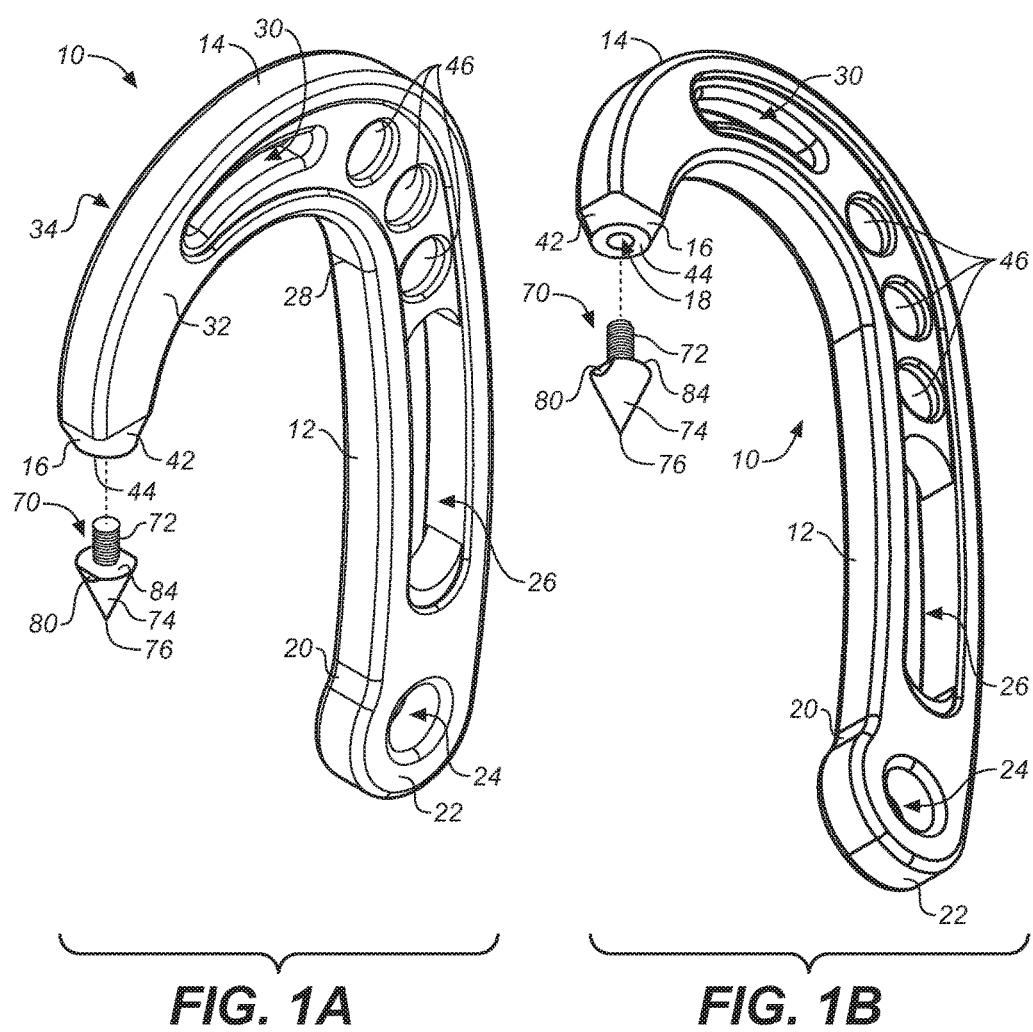
FIG. 1A is an upper front right view of an embodiment of the rapid escape anchor of the present invention.
FIG. 1B is a lower front right view thereof.

Referring first to FIGS. 1A through 6, wherein like reference numerals refer to like components in the various views, there is illustrated therein a new and improved rapid escape anchor, generally denominated 10 herein.

In an embodiment, the inventive rapid escape anchor (or anchor hook) 10, includes shank portion 12, a hook portion 14, a tip holder 16 having a threaded female hole 18 for threadable insertion of a hardened steel piercing tip 70.

The shank portion of the escape anchor includes at its bottom end 20 an anchor tool loop 22 with a hole 24 for passage of a safety rope. Medially, the shank portion includes a body slot 26 for attaching a hitching loop formed from the safety rope. At the upper end 28 of the shank portion, the hook portion 14 is integrally formed and extends in an arc to the tip holder 16. The hook portion includes a saddle slot 30 for attachment of a hook pull strap for rapid deployment.

The escape anchor profile is generally flat, or planar, with substantially planar right and left sides 32, 34, each preferably having beveling 36 at the edges where they transition to the front and rear sides 38, 40. Front side 38 is generally arcuate and rear side may conform, providing parallel arc shape that maintains a uniform width (front to rear side) throughout the shank portion. The arcuate shape of the front side 38 is functional, supporting the escape anchor's self-righting feature, as described more fully below.

The tip holder 16 includes a conical (tapered) shape with sides 42 angling downwardly to a truncated lower end that forms a flat seat 44 for surface-to-surface contact with the flat inboard side of the piercing tip (see below).

To further reduce overall anchor weight, circular recesses 46 are cut into the shank and hook portion body.

Figure 7:
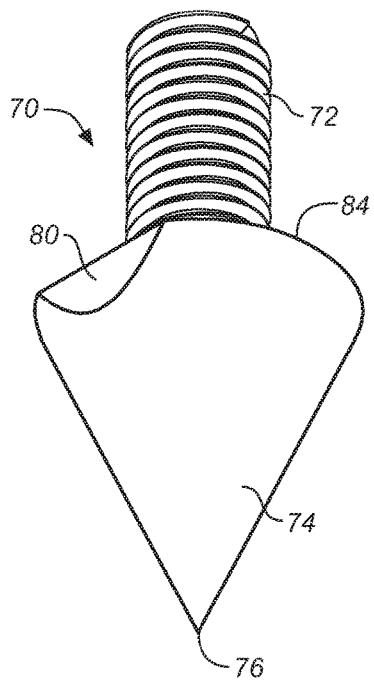
FIG. 7 is an upper front perspective view of the replaceable hardened steel tip used with the escape anchor.
Figure 8:
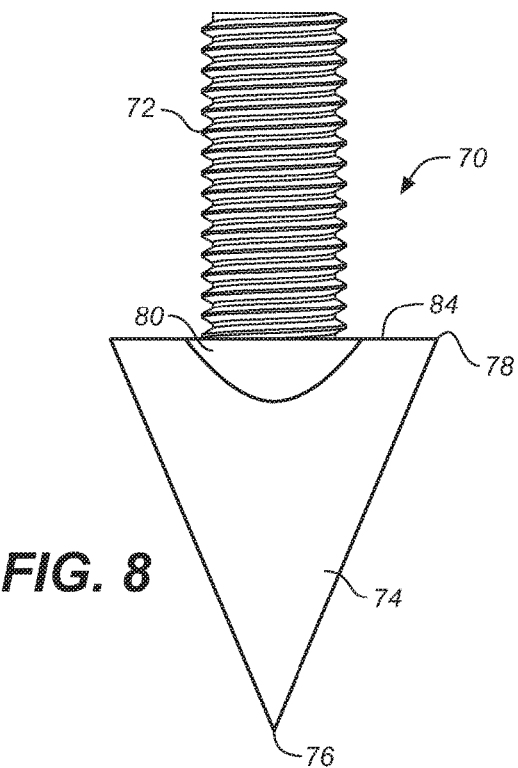
FIG. 8 is a left side view in elevation thereof.
Figure 9:
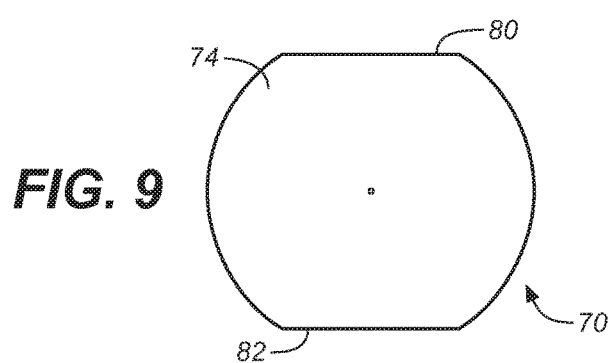
FIG. 9 is a front view in elevation.
Figure 10A:
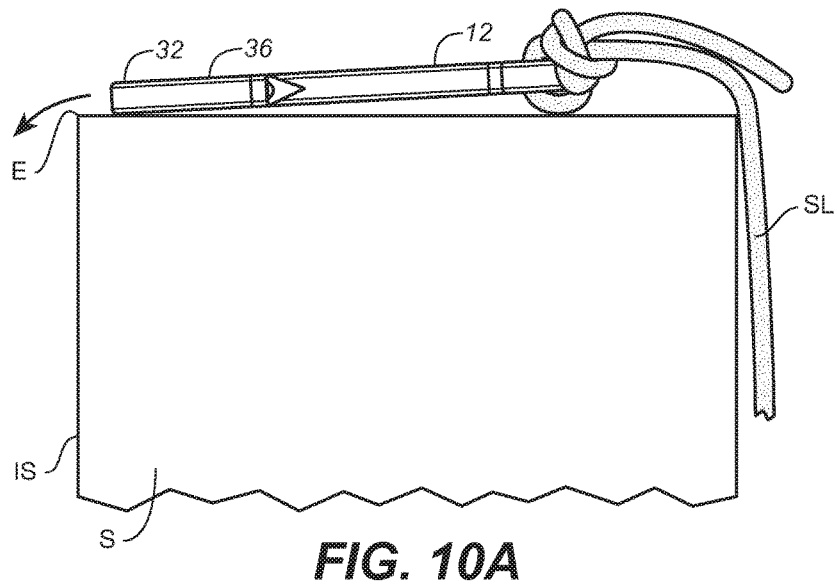
FIG. 10A is a side view in elevation showing the escape anchor positioned atop a sill.
Figure 10B:
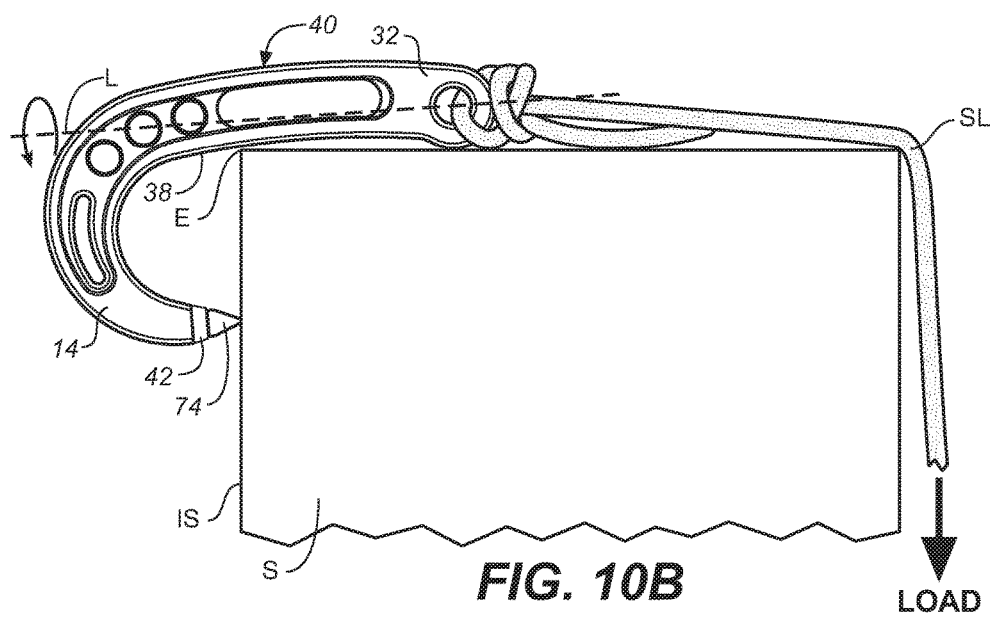
FIG. 10B is the same view showing the anchor's self-right feature as it is draped over the rear edge of the sill.
Figure 11A:
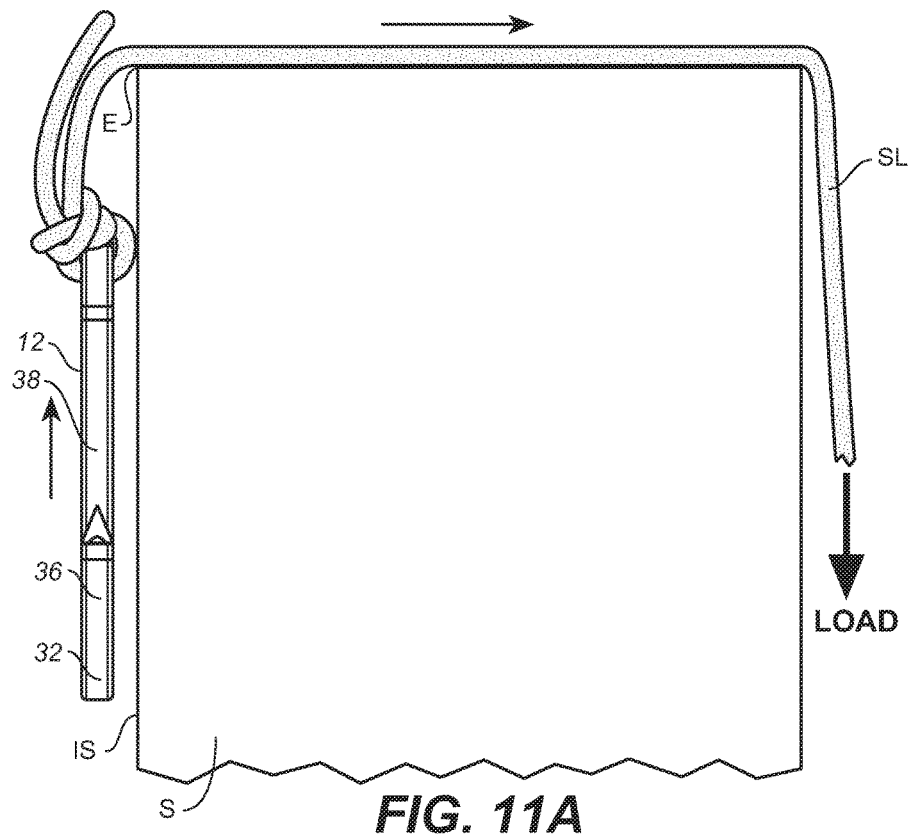
FIG. 11A is a side view in elevation showing the anchor dangling below the edge of a sill.
Figure 11B:
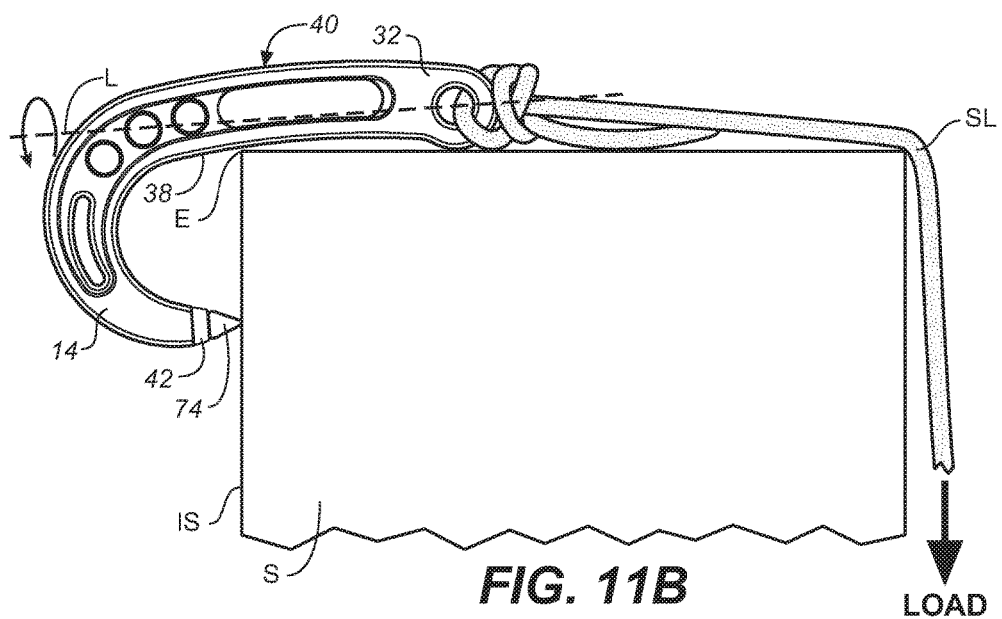
FIG. 11B is the same view showing the self-right feature as the anchor is pulled up into contact with the upper rear edge of the sill.

Referring next to FIGS. 7-9, there is shown the hardened steel tip 70 used with the escape anchor of the present invention. The tip is a unitary steel piece formed to include a threaded shaft 72 for threaded insertion into threaded hole 18 of the escape anchor tip holder 16. The tip further includes a conical tip 74 having a sharpened piercing point 76. The base 78 of the conical tip includes opposing flats 80, 82 adapted for an installation/removal wrench so that the tip can be tightened very securely and then rapidly removed to replace any tip having a dulled point. The bottom 84 of the conical tip is flat, as noted, for surface-to-surface mating with the flat seat 44 of escape anchor tip holder 16.

The shank and hook portions of the escape anchor are preferably fabricated from lightweight 7000 series aluminum. The overall weight is less than 7 ounces. The tip, by contrast, is made from a hardened steel and is extremely heavy in comparison to the weight of the remainder of the escape anchor. Accordingly, when set on either the right or left side, or on the rear side (i.e., on edge), the anchor naturally has a self-righting feature that encourages it to turn over into a tip down orientation to facilitate digging into structure as it is pulled by the rope from its lower end. In this manner, even in situations in which the user is so rushed that even orienting the hook may involve critical time, the anchor assists in ensuring that the device gets positioned optimally to puncture and penetrate structure and to set the anchor. Furthermore, when a safety line is secured to the bottom end of the shank portion through the tool hook loop only, and then when the escape anchor is draped over the edge of a potential anchoring point, such as a window sill, the weighted tip will pull the hook portion downward and thus rotate the entire escape anchor about its longitudinal axis L to ensure that when pulled, the tip will engage the interior side of the structure (i.e., the wall below the sill) and dip in to take purchase and provide a suitable anchor point for a descent.

It should be noted that prior art escape anchor tips are all made with a bevel from the point to the base of approximately 80 degrees. This feature is ostensibly intended to prevent dulling. However, in practice the tips dull readily and routinely. Furthermore, when employing the prior art tips, because the overall anchor lacks the self-righting feature discussed above, users complain that there is a substantial risk that the point will not find purchase and that the anchor will thus not set. It takes no imagination whatsoever to appreciate how devastatingly deficient such a design can be. Accordingly, the inventive escape anchor will set nearly faultlessly close to 100% of the time under no more than 1 pound of anchoring function when pulled longitudinally with a safety line connected to the anchor tool loop.

In use, the escape anchor is incorporated into a bailout system that includes the anchor hook attached to a safety line. The escape and anchor and a portion of the safety line are stored in a bailout pouch attached to either a waist belt or other strap on a harness. A portion of the anchor may be exposed so as to facilitate easy location and grasping. The escape anchor can be rapidly removed and deployed simply by pulling the escape anchor from the pouch. The escape anchor is then secured either by puncturing through the surface of a suitably sturdy weight bearing structural member or feeding the hook through a hitch formed around such a structure. The user may then move away from the escape anchor, controlling the rate of motion using a descender device.

Looking now at FIGS. 10A through 11B, when deployed rapidly and without the opportunity to select and secure the escape anchor to an anchor point, in some circumstances (by way of example only) the anchor may be dangled over the edge of a sill, such as a window sill S. The self-righting feature of the escape anchor is critical in such circumstances, and this feature distinguishes the inventive device over all known anchoring devices. If the device is pushed rearward off the top of a sill (see FIG. 10A-10B), as it extends longitudinally over the rear edge of the sill, it will pivot or rotate about its longitudinal axis and onto its front side 38 so that the tip 74 is positioned to optimally engage the interior side IS of the sill or wall structure. Geometrically, a line connecting the longitudinal axis with the tip point 76 is approximately parallel to the axis of the safety line SL, thereby aligned (in the same plane as the safety line) and oriented for bearing the load on the rope. When pulled up to the sill edge E [see FIGS. 11A-11B], as the escape anchor slides up to and over the edge E, the edge will function as a fulcrum point such that the anchor will also rotate about its longitudinal axis L, such that the tip remains below the shank portion and a line from the tip through the longitudinal axis will be in line with the direction of pull of the safety line.

Thus, in its most essential aspect, the rapid escape anchor of the present invention is seen to include a shank portion having front and rear sides, generally planar right and left sides, a lower end having a rope hole for passing a safety rope and thereby forming an anchor tool loop, and an upper end, the shank portion having an elongate body slot; a curved hook portion extending integrally from the upper end of the shank portion, wherein the hook portion has front and rear sides continuous with the front and rear sides of the shank portion, generally planar right and left sides coplanar with the right and left sides of the shank portion, a tip holder at a terminal end and having a female hole, the hook portion having an arcuate saddle slot; and a piercing tip having a shaft portion removably inserted into the female hole of said tip holder. when said escape anchor is disposed on a surface on any of said right side, left side, or rear side, and when pulled longitudinally from a rope connected to said anchor tool loop, the weight distribution of the piercing tip in relation to the shank and hook portions induce the anchor to rotate about its longitudinal axis (i.e., to turn over) so as to be in a point down orientation, either to align the point for penetration of a surface across which it is being dragged or to align the point for to puncture a vertical structure into which it is pulled [see, esp., FIGS. 10A-11B].

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A rapid escape anchor, comprising:
   a shank portion having front and rear sides, generally planar right and left sides, a lower end having a rope hole for passing a safety rope and thereby forming an anchor tool loop, and an upper end, said shank portion having an elongate body slot;
   a curved hook portion extending integrally from said upper end of said shank portion, said curved hook portion having front and rear sides continuous with said front and rear sides of said shank portion, generally planar right and left sides coplanar with said right and left sides of said shank portion, a tip holder at a terminal end and having a female hole, said curved hook portion having an arcuate saddle slot; and
   a piercing tip having a shaft portion removably inserted into said female hole of said tip holder;
   wherein said tip holder tapers downwardly to form a conical shape with sides angling downwardly to a truncated lower end that form a flat seat for surface-to-surface contact with a flat inboard side of said piercing tip.

2. The rapid escape anchor of claim 1, wherein said female hole is a threaded hole.

3. The rapid escape anchor of claim 2, wherein said shaft portion of said piercing tip is threaded for threadable insertion in said threaded female hole.

4. The rapid escape anchor of claim 1, wherein an escape anchor profile is generally flat and said right and left sides include beveled edges at transitions to said front and rear sides.

5. The rapid escape anchor of claim 1, wherein said front sides have a curvature and is generally arcuate and said rear sides generally conform to the curvature of said front sides so as to provide a generally parallel arc shape that maintains a uniform width from said front side to said rear side throughout said shank portion.

6. The rapid escape anchor of claim 1, wherein said lower end of said shank portion includes a tool loop.

7. The rapid escape anchor of claim 1, wherein said body slot is medially positioned in said shank portion and is sized for passing a hitching loop in the safety rope.

8. The rapid escape anchor of claim 1, wherein said piercing tip includes a conical tip having a sharpened piercing point and a base with opposing flats adapted for an installation/removal wrench.

9. The rapid escape anchor of claim 1, wherein said shank portion and said hook portion are fabricated from lightweight aluminum having an overall weight of less than 7 ounces.

10. The rapid escape anchor of claim 9, wherein said piercing tip is fabricated from a hardened steel.

11. The rapid escape anchor of claim 10, wherein said piercing tip includes a weight distribution in relation to said shank portion and said hook portion such that when said escape anchor is disposed on a surface on any of said right sides, left sides or rear sides, and when pulled longitudinally from a rope connected to said anchor tool loop, said weight distribution of said piercing tip in relation to said shank portion and said hook portion will cause said escape anchor to tend to rotate about its longitudinal axis into a tip down orientation so as to facilitate digging into structure.

12. The rapid escape anchor of claim 1, further including a plurality of holes disposed between said body slot and said saddle slot.

13. A self-righting rapid escape anchor, comprising:
    integral curved shank and hook portions having a longitudinal axis and fabricated from a monolithic bar of lightweight metal, forming front and rear sides, generally planar right and left sides, a shank portion lower end with a rope hole, a tip holder at a terminal end of said hook portion with and having a receiving hole for coupling a tip; and
    a selectively removable piercing tip removably inserted into said receiving hole of said tip holder;
    wherein said piercing tip is fabricated from a metal sufficiently heavy in relation to said integral shank and hook portions so as to induce rotation about said longitudinal axis when a rope attached to said escape anchor through said rope hole is pulled downwardly.

14. The rapid escape anchor of claim 13, wherein said integral shank and hook portions are fabricated from aluminum.

15. The rapid escape anchor of claim 14, wherein said piercing tip is fabricated from hardened steel.

16. The rapid escape anchor of claim 13, further including a body slot disposed in said shank portion.

17. The rapid escape anchor of claim 13, further including a saddle slot disposed in said curved hook portion.

18. The rapid escape anchor of claim 13, wherein said piercing tip includes surface features for fitting a removal tool.

19. The rapid escape anchor of claim 13, wherein said tip holder is tapered.

* * * * *